United States Patent Office 2,731,472
Patented Jan. 17, 1956

2,731,472

PRODUCTION OF HETEROCYCLIC COMPOUNDS FROM GLYOXAL AND UREA

Bruno v. Reibnitz, Mannheim, Germany, assignor to Badische Anilin- & Soda-Fabrik Aktiengesellschaft, Ludwigshafen (Rhine), Germany No Drawing. Application July 25, 1952, Serial No. 300,979

Claims priority, application Germany August 2, 1951

5 Claims. (Cl. 260—309.7)

This invention relates to a process of producing heterocyclic compounds from glyoxal and urea.

It is already known that glycoluril, the so-called acetylene diurea, can be prepared by the reaction of commercial glyoxal solutions with an excess of urea in strongly acid range. The 4,5-dihydroxy imidazolidone-2, however, cannot be obtained by the simple action of urea on commercial glyoxal solutions, such as are obtained by the oxidation of glycol, acetaldehyde or paraldehyde.

It has therefore already been proposed to add water to commercial glyoxal solutions prepared for example by oxidation of paraldehyde with nitric acid, to distil off the added water in vacuo at about 35° C. and to carry out this treatment of the glyoxal solution ten times. Glyoxal solutions which have been thus pretreated can then be reacted with urea to give crystalline glyoxal monoureine, whereas with glyoxal solutions which have not been pretreated only resinous products are obtained by such a reaction.

I have now found that the 4,5-dihydroxy imidazolidone-2 can be obtained in an industrially simple manner by adjusting the acid-reacting commercial glyoxal solutions to a pH greater than 4, preferably 5 to 7, by the addition of acid-binding agents and then reacting them with urea. pH values higher than 9 should however be avoided, because then the glyoxal tends to react in undesired manner, so that the yields of 4,5-dihydroxy imidazolidone-2 are decreased.

The reaction takes place according to the following scheme.

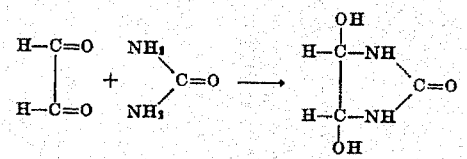

The aqueous glyoxal solutions used for the reaction should preferably be concentrated and advantageously should contain 30 to 50% of glyoxal. There may be used for the process both the commercial acid-reacting glyoxal solutions such as are obtained by the oxidation of acetaldehyde or its polymers with nitric acid, and also glyoxal solutions which have been produced by oxidation of ethylene glycol, for example with air. Since these solutions are as a rule rather diluted, it is preferable to concentrate them to the most favorable concentration prior to reaction with urea.

It is preferable to use 1 to 2 mols of urea for each mol of glyoxal. Weakly basic-reacting compounds, such as the carbonates or dicarbonates of the alkalies are especially suitable as acid-binding agents, and also the oxides, hydroxides or carbonates of the alkaline earths.

The reaction takes place at room temperature with slight heating of the reaction solution. The 4,5-dihydroxy imidazolidone-2 separates after stirring for several hours in the form of a crystalline precipitate. In order to increase the yield, the solution may be allowed to stand for a long time, for example some days, and it is preferable to cool it gradually, for example to about 0° C.

According to a preferred modification of the process, the production of 4,5-dihydroxy imidazolidone-2 is combined with the recovery of glycoluril. For this purpose the precipitated monoureine is separated and the residual mother liquor is acidified, preferably with a strong mineral acid to a pH of 1 to 3, and heated, preferably to temperatures of 80° C. to 100° C., if desired after the addition of further urea, whereby the glycoluril separates as a crystalline precipitate. There should preferably be a molecular ratio of 4,5-dihydroxy imidazolidone-2 to urea of from 1:1 to 1:3 present during the second stage of the process. In this way a practically complete conversion of the glyoxal into heterocyclic compounds is obtained.

The following example will further illustrate this invention but the invention is not limited to this example. The parts are by weight.

Example 100 parts of a 32% glyoxal solution, which has been obtained by oxidation of acetaldehyde with nitric acid and subsequent evaporation in vacuo and which has an acid value of 80 (80 milligrams of KOH per gram of solution) has 7.5 parts of calcined soda added thereto in portions. When the evolution of $CO_2$ has ended, the solution has a pH of about 7. Then 50 parts of urea are stirred in, the temperature thus rising to 35° C. to 40° C. in the course of about half an hour. The solution is stirred for about 12 hours and at the same time cooled gradually to about 0° C. The crystalline 4,5-dihydroxy imidazolidone-2 thus separated (yield about 25 parts) is filtered off. A further 15 parts of 4,5-dihydroxy imidazolidone-2 can be recovered from the mother liquor by careful evaporation in vacuo to about half the volume at 35° C. The total yield of monoureine is 61% of the theoretical yield. The filtrate is diluted with twice the amount of water and acidified with hydrochloric acid to a pH value of about 2 to 3. Another 25 parts of urea are then added and the whole heated to 95° C. to 97° C. About 25 parts of glycoluril separate as a fine crystalline precipitate and are filtered off.

What I claim is:

1. A process for the production of 4,5-dihydroxy imidazolidone-2 which comprises adjusting an aqueous glyoxal solution by the addition of an inorganic acid binding agent to a pH value of from 5 to 9 and reacting this solution with the urea until the crystalline 4,5-dihydroxy imidazolidone-2 has been formed.

2. A process for the production of 4,5-dihydroxy imidazolidone-2 which comprises adjusting an aqueous acid-reacting glyoxal solution containing from 30 to 50% of glyoxal by the addition of an inorganic acid-binding agent to a pH value of from 5 to 7 and reacting this solution with urea until the crystalline 4,5-dihydroxy imidazolidone-2 has been formed, the molecular ratio of glyoxal to urea being from 1:1 to 1:2.

3. A process for the production of heterocyclic compounds from glyoxal and urea which comprises adjusting an aqueous acid-reacting glyoxal solution by the addition of an inorganic acid-binding agent to a pH value of from 5 to 9 and reacting it with urea until the crystalline 4,5-dihydroxy imidazolidone-2 has been formed, separating the crystalline 4,5-dihydroxy imidazolidone-2 formed from the solution, acidifying the mother liquor by the addition of a mineral acid to a pH value of from 1 to 3, adding urea and heating the solution to a temperature of from 80° C. to 100° C. until the crystalline glycoluril has been formed.

4. A process for the production of heterocyclic compounds from glyoxal and urea which comprises adjusting an aqueous acid-reacting glyoxal solution by the addition of an inorganic acid-binding agent to a pH value of from 5 to 9 and reacting it with urea until the crystalline 4,5-dihydroxy imidazolidone-2 has been formed, separating then the crystalline 4,5-dihydroxy imidazolidone-2 from the solution, acidifying the mother liquor by the addition of a mineral acid to a pH value of from 1 to 3, adding urea and heating the solution to a temperature of from 80° C. to 100° C. until the crystalline glycoluril has been formed, the molecular ratio of glyoxal and urea in the first step being from 1:1 to 1:2 and the molecular ratio of 4,5-dihydroxy imidazolidone-2 and urea in the second step from 1:1 to 1:3.

5. A process for the production of heterocyclic compounds from glyoxal and urea which comprises adjusting an acid-reacting aqueous glyoxal solution containing from 30 to 50% of glyoxal obtained by the oxidation of acetaldehyde with nitric acid by the addition of an acid-binding agent to a pH value of from 5 to 7, adding then such a quantity of urea that the molecular ratio of glyoxal and urea amounts from 1:1 to 1:2, separating after cooling the formed crystalline 4,5-dihydroxy imidazolidone-2, acidifying the mother liquor with a mineral acid to a pH value of from 1 to 3, adding urea so that the molecular ratio of 4,5-dihydroxy imidazolidone-2 and urea in the mother liquor amounts from 1:1 to 1:3, and heating the reaction mixture to a temperature of from 80° C. to 100° C. until the crystalline glycoluril has been formed.

References Cited in the file of this patent

Fisher et al.: JACS, vol. 64, pp. 1434–36.
Chem. Abst., vol. 25, p. 279 citing Pauly, Berichte 63B, pp. 2063–69.
Annalen, vol. 189, pp. 157–61.
Annalen, vol. 339, pp. 3–10.